Figure 1:
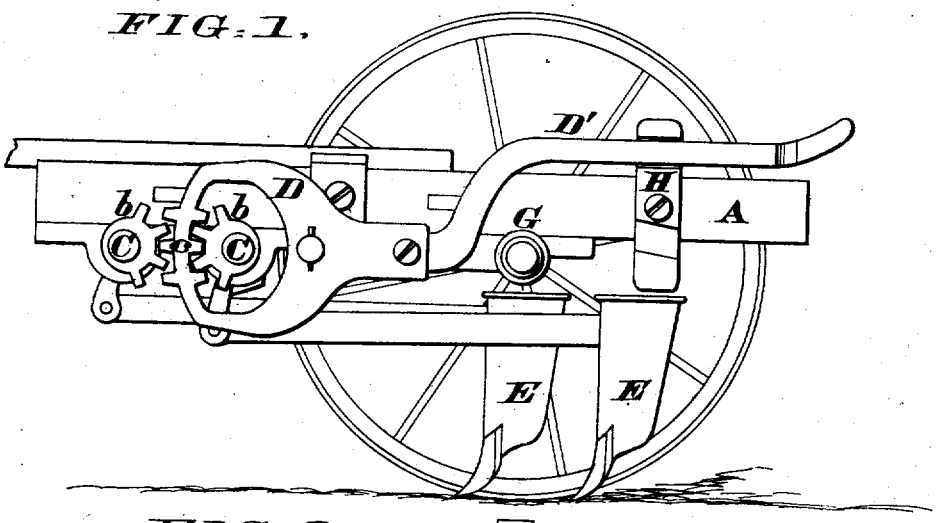

J. F. KELLER.

Assignor to HAGERSTOWN AGRICULTURAL IMPLEMENT MANUFACTURING Co.

Seeder.

No. 8,343. Reissued July 23, 1878.

Attest,
Jeremiah F. Twohig
Arthur Skene

Inventor.
John F. Keller
By Hulett & Parkinson
Attorneys

N. PETERS, PHOTO-LITHOGRAPHER, WASHINGTON, D. C.

UNITED STATES PATENT OFFICE.

JOHN F. KELLER, OF HAGERSTOWN, MARYLAND, ASSIGNOR TO HAGERSTOWN AGRICULTURAL IMPLEMENT MANUFACTURING COMPANY.

IMPROVEMENT IN SEEDERS.

Specification forming part of Letters Patent No. 153,345, dated July 21, 1874; Reissue No. 8,343, dated July 23, 1878; application filed February 14, 1878.

DIVISION A.

*To all whom it may concern:*

Be it known that I, JOHN F. KELLER, of Hagerstown, Washington county, Maryland, have invented an Improvement in Seeders, of which the following is a specification:

This invention relates especially to seeders, and particularly to that class of seeding-machines wherein vertical and longitudinal drill-teeth or tubular hoes are employed in gangs, and especially in drills with spring-hoes.

The improvement sought to be covered by this specification, Division A, consists especially in so constructing the draft-frame and the axles for the transporting-wheels that the hoes or drill-teeth can be raised without interference with the axle or any cross-bar of the frame, said axles affording rigid braces for said frame, as will be hereinafter explained.

A portion of my invention that is shown in the drawings, and that is designed to be covered by Division B of this reissue, relates to a new device for adjusting the hoes into one or two lines.

Figure 2:
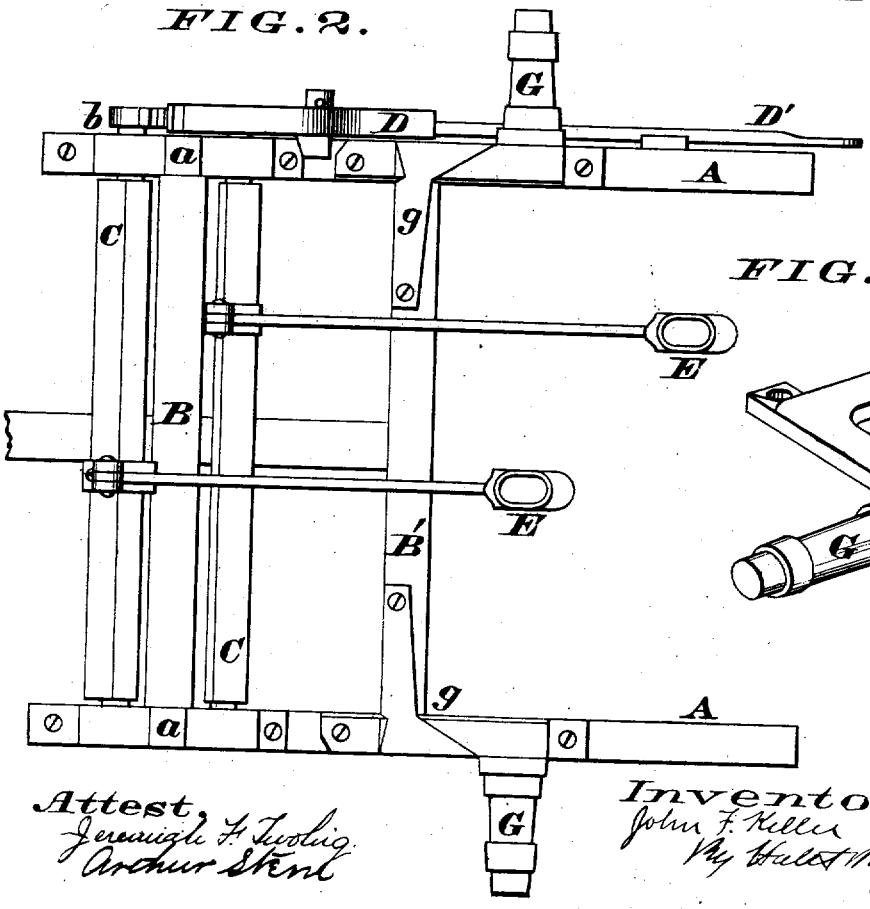
Figure 3:
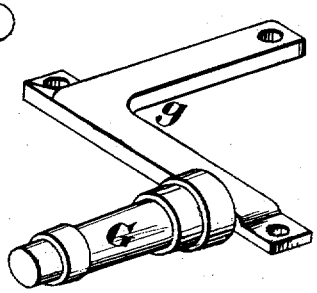

In the drawings, Figure 1 is a representation of a side view of a grain-drill containing my improvements. Fig. 2 is a bottom view, and Fig. 3 is a view of the axle.

In the drawings, A A designate two longitudinal bars, and B B′ are two cross-bars, which constitute a frame for a seeding-machine. Near the front end of this frame, and supported by journal-boxes *a a*, which are bolted to the under sides of the bars A A, are two rocking bars, C C, which are arranged parallel to each other, and have toothed segments *b b* on their ends. These segments engage with a curved rack, *c*, which is formed on the looped end D of a vibrating lever, D′. By vibrating this lever the bars C C can be rocked in opposite directions.

E E designate the tubular drill-teeth or hoes, which are connected by means of their drag-bars to brackets, which are secured to the rocking bars C C. The hoes are thus alternately attached to the said bars, and allowed free vertical motion, so that they will accommodate themselves to inequalities of the surface passed over. By rocking the bars C C the hoes can all be adjusted in one line, or they can be adjusted in two lines.

The part of my invention that is more especially designed to be covered by this division of the reissue I will now proceed to explain more fully. It relates to the peculiar axles of the drill.

G G represent the axles on which the transporting-wheels are applied. These axles do not extend directly across the frame, as, if they did so, the hoes E, arranged in the front rank, being almost directly under the line of the axle, when lifted by hitting an obstruction, would be raised, and the broad top of the leg (seen more clearly in Fig. 1) would be lifted against the bottom of the axle, and would be firmly bound in place, and would be unable to give to loose itself from the obstruction, and thus the hoe would be broken off or the progress of the drill stopped. To obviate this difficulty, the axles are so constructed that they do not extend directly across the frame; but they are made with L-shaped braces *g*, which I have shown bolted to the under side of the longitudinal bars A A and the cross-bar B′. Thus the frame is firmly braced, and at the same time the axles are firmly secured.

The cross-bar B′ is arranged so far in front of the axles G that the hoes are free to rise clear of the ground.

I claim in this division—

1. In a spring hoe drill, the axles G, constructed substantially as described, in combination with the bars A A B′ and hoes E, as and for the purposes set forth.

2. The combination, in a spring hoe drill, of the crooked axle crossing the machine forward of the foremost line of hoes, with the hoes arranged relatively to one another, substantially as described, so as to permit the hoes to be raised when meeting with obstructions.

3. In a spring hoe drill, the short axle G, with crooked arms *g*, constructed substantially as described, so as to act as a brace to strengthen the machine.

JOHN F. KELLER.

Witnesses:
D. F. HULL,
JNO. M. KNODLE.